(12) United States Patent
Molnar et al.

(10) Patent No.: US 8,859,638 B1
(45) Date of Patent: Oct. 14, 2014

(54) METHOD FOR MAKING A HIGH SOLIDS CROSS-LINKED ETHYLENE PROPYLENE DIENE TERPOLYMER LATEX

(71) Applicant: Lion Copolymer Geismar, LLC, Geismar, LA (US)

(72) Inventors: Michael J. Molnar, Baton Rouge, LA (US); George A. Von Bodungen, Baton Rouge, LA (US); Subir Debnath, Baton Rouge, LA (US); Harold William Young, Jr., Baton Rouge, LA (US); Zhiyong Zhu, Baton Rouge, LA (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

(21) Appl. No.: 14/228,153

(22) Filed: Mar. 27, 2014

Related U.S. Application Data

(60) Provisional application No. 61/829,961, filed on May 31, 2013, provisional application No. 61/829,971, filed on May 31, 2013, provisional application No. 61/829,975, filed on May 31, 2013.

(51) Int. Cl.
| | | |
|---|---|---|
| *C09D 5/16* | (2006.01) | |
| *C08K 13/02* | (2006.01) | |
| *C08L 23/08* | (2006.01) | |
| *C09D 145/00* | (2006.01) | |
| *C09D 123/14* | (2006.01) | |
| *C09J 145/00* | (2006.01) | |
| *C09J 123/14* | (2006.01) | |
| *C08J 3/11* | (2006.01) | |
| *C08J 3/05* | (2006.01) | |
| *C08J 3/24* | (2006.01) | |
| *C08J 3/26* | (2006.01) | |
| *C08J 3/07* | (2006.01) | |
| *C08F 8/34* | (2006.01) | |
| *C08F 210/18* | (2006.01) | |

(52) U.S. Cl.
CPC ............. *C08K 13/02* (2013.01); *C08L 23/08* (2013.01); *C09D 145/00* (2013.01); *C09D 123/145* (2013.01); *C09J 145/00* (2013.01); *C09J 123/145* (2013.01); *C08J 3/11* (2013.01); *C08J 3/05* (2013.01); *C08J 3/243* (2013.01); *C08J 3/26* (2013.01); *C08J 3/07* (2013.01); *C08F 8/34* (2013.01); *C08F 210/18* (2013.01)
USPC ............. 523/122; 523/303; 524/47; 524/451; 525/331.7; 525/331.8

(58) Field of Classification Search
CPC ............ C08F 8/34; C08F 210/18; C08J 3/05; C08J 3/07; C08J 3/11; C08J 3/243; C08J 3/26; C08K 13/02; C08L 23/08; C09D 119/00; C09D 119/02; C09D 123/145; C09D 145/00; C09J 123/145; C09J 145/00
USPC .......... 523/122, 303; 524/47, 451; 525/331.7, 525/331.8
See application file for complete search history.

(56) References Cited

U.S. PATENT DOCUMENTS

| | | |
|---|---|---|
| 3,894,978 A | 7/1975 | Montesissa et al. |
| 3,979,346 A | 9/1976 | Zuckert et al. |
| 4,299,742 A | 11/1981 | Belder et al. |
| 4,301,048 A | 11/1981 | Hirayama et al. |
| 4,497,933 A | 2/1985 | Gorzinski et al. |
| 5,985,953 A | 11/1999 | Lightsey et al. |
| 7,078,453 B1 * | 7/2006 | Feeney et al. ................ 524/493 |
| 8,357,733 B2 | 1/2013 | Wallen et al. |

\* cited by examiner

*Primary Examiner* — Edward Cain
(74) *Attorney, Agent, or Firm* — Buskop Law Group, PC; Wendy Buskop

(57) ABSTRACT

A low pressure, low volatile, low energy method to make an ethylene, propylene diene terpolymer latex usable in paints, adhesives, and as a coating.

19 Claims, 3 Drawing Sheets

*FIGURE 1*

Examples Group 1

| Materials | Function | Source | 2 Pound | 3 Pound | 4 Pound |
|---|---|---|---|---|---|
| Royalene® 360 | EPDM Polymer | Lion Copolymer, LLC | 15 | 50 | 70 |
| Cement conc. | | | 8% | 8% | 8% |
| DI Water | | | 54.5 | 29 | 18.5 |
| Efka® 6225 | Dispersing surfactant | BASF | 30.2 | 20 | 10 |
| Trigonox® 101 | Curing agent | AkzoNobel | 0.3 | 1 | 1.5 |
| | | Total (pound) | 100.0 | 100.0 | 100.0 |
| | | Total Solid (%) | 46% | 71% | 82% |
| | | Crosslinking extent | 45% | 85% | 100% |

*FIGURE 2*

Examples Group 2

| Materials | Function | Source | 5 Pound | 6 Pound | 7 Pound |
|---|---|---|---|---|---|
| Royalene® 511 | EPDM Polymer | Lion Copolymer, LLC | 88 | 70 | 50 |
| Cement conc. | | | 4% | 8% | 50% |
| DI Water | | | 10.1 | 27.7 | 47.2 |
| Nuosperse FA 607 | Dispersing surfactant | Elementis | 1 | 1 | 1 |
| Accelerator TMTD | Curing accelerator | AkroChem | 0.3 | 0.4 | 0.56 |
| (RM) Sulfur | Curing agent | AkroChem | 0.6 | 0.9 | 1.2 |
| | | Total (pound) | 100.0 | 100.0 | 100.0 |
| | | Total Solid (%) | 90% | 72% | 53% |
| | | Crosslinking extent | 50% | 85% | 98% |

FIGURE 3

Examples Group 3

| Materials | Function | Source | 8 Pound | 9 Pound | 10 Pound |
|---|---|---|---|---|---|
| Royalene® 535 | EPDM Polymer | Lion Copolymer, LLC | 26 | 50 | 70 |
| Cement conc. | | | 8% | 8% | 8% |
| DI Water | | | 70.1 | 42.7 | 18.2 |
| Zonyl® FSA | Dispersing surfactant | Dupont | 3 | 6 | 10 |
| Accelerator TMTD | Curing accelerator | AkroChem | 0.3 | 0.4 | 0.56 |
| (RM) Sulfur | Curing agent | AkroChem | 0.6 | 0.9 | 1.2 |
| | | Total (pound) | 100.0 | 100.0 | 100.0 |
| | | Total Solid (%) | 30% | 57% | 82% |
| | | Crosslinking extent | 60% | 65% | 65% |

FIGURE 4

| Examples Group 4 | | | 11 | 12 | 13 | 14 | 15 | 16 | 17 | 18 |
|---|---|---|---|---|---|---|---|---|---|---|
| Materials | Function | Source | Pound | Pound | Pound | Pound | Pound | Pound | Pound | Pound |
| Royalene® 511 | EPDM Polymer | Lion Copolymer, LLC | 50 | 50 | 50 | 50 | 40 | 40 | 40 | 40 |
| Cement conc. | | | 8% | 8% | 8% | 8% | 8% | 8% | 8% | 8% |
| DI Water | | | 46.16 | 45.06 | 36.15 | 10.96 | 35.66 | 35.66 | 40.56 | 13.46 |
| Nuosperse FA 607 | Dispersing surfactant | Elementis | 1 | 1 | 2 | 2 | 4 | 4 | 4 | 4 |
| Accelerator TMTD | Curing accelerator | AkroChem | 0.56 | 0.56 | 0.56 | 0.56 | 0.56 | 0.56 | 0.56 | 0.56 |
| (RM) Sulfur | Curing agent | AkroChem | 1.2 | 1.2 | 1.2 | 1.2 | 1.2 | 1.2 | 1.2 | 1.2 |
| CELLOSIZE™ ER 30M | Anti-settling agent | Dow Chemicals | 1 | 2 | 5 | 5 | 8 | 8 | 8 | 10 |
| Protectol® DZ | Biocide | BASF | | 0.1 | 0.01 | 0.2 | | | | 0.2 |
| Byk®-021 | Defoamer | BYK | | | | | 0.5 | 0.5 | 0.5 | 0.5 |
| RP 9405 Talc | Filler | Cimbar | | | 5 | | 5 | 5 | 5 | |
| Hi-Sil 135 | Filler | PPG Industries | | | | 30 | | | | 20 |
| Tioxide TR23 | Filler and pigment | Huntsman | | | | | 5 | | | |
| Regal® 300 | Filler and pigment | Cabot | | | | | | 5 | | |
| Synthetic Red oxide | Pigment | Unilex | | | | | | | 0.1 | 10 |
| | Total (pound) | | 100 | 100 | 100 | 100 | 100 | 100 | 100 | 100 |
| | Total Solid (%) | | 54% | 55% | 64% | 89% | 64% | 64% | 59% | 87% |
| | Crosslinking extent | | 80% | 80% | 80% | 80% | 85% | 85% | 85% | 85% |

METHOD FOR MAKING A HIGH SOLIDS CROSS-LINKED ETHYLENE PROPYLENE DIENE TERPOLYMER LATEX

CROSS REFERENCE TO RELATED APPLICATIONS

The present application claims priority to and the benefit of U.S. Provisional Patent Application Ser. No. 61/829,961 filed on May 31, 2013, entitled "METHOD FOR MAKING A HIGH SOLIDS CROSS-LINKED ETHYLENE PROPYLENE DIENE MONOMER LATEX"; U.S. Provisional Patent Application Ser. No. 61/829,971 filed on May 31, 2013, entitled "HIGH SOLIDS CROSS-LINKED ETHYLENE PROPYLENE DIENE MONOMER LATEX"; and U.S. Provisional Patent Application Ser. No. 61/829,975 filed on May 31, 2013, entitled "CROSS-LINKED ETHYLENE PROPYLENE DIENE LATEX BLENDS FOR IMPROVED COATINGS". These references are hereby incorporated in their entirety.

FIELD

The present embodiments generally relate to a method for making a stable cross-linked ethylene propylene diene terpolymer latex with a customer specified solids content from 30 weight percent to 60 weight percent based on the total weight of the latex, and wherein the latex is an aqueous dispersion.

BACKGROUND

A need exists for a water based formulation that when cured, allows building owners to have a low cost barrier on many parts of a coated building that provides an improved moisture barrier than current coatings while simultaneously reducing mold build up in buildings.

A need exists for a water based formulation that can be applied to buildings easily with and easy clean-up, which will reduce mold borne sicknesses and allergies.

A need exists for a water based moisture barrier formulation that when cured, will last longer than commercial acrylic coatings to lower the energy loss and reduce the demand for energy in buildings.

A need exists for a water based surface treatment formulation that when cured, will be long lasting, reducing the demand for foreign oil.

A need exists for a water based formulation that when applied to a building, will have low volatile organic compounds to help protect the workers and the atmosphere.

The present embodiments meet these needs.

BRIEF DESCRIPTION OF THE FIGURES

The detailed description will be better understood in conjunction with the accompanying drawings as follows:

FIG. 1 is additional information relative to examples 2-4 according to the embodiments.

FIG. 2 is additional information relative to examples 5-7 according to the embodiments.

FIG. 3 is additional information relative to examples 8-10 according to the embodiments.

FIG. 4 is additional information relative to examples 11-18 according to the embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method to make a cross-linked ethylene propylene diene terpolymer latex usable as a waterproofing material for roofs, or usable in paints to improve adhesion or usable in adhesives to provide a better matrix.

The resulting cross-linked terpolymer latex will have a customer specified solids content from 30 weight percent to 60 weight percent based on the total weight of the latex.

The method involves blending 15 weight percent to 88 weight percent of a premixed liquid ethylene propylene diene terpolymer (EPDM) component into 10 weight percent to 70 weight percent of a water and 1 weight percent to 30 weight percent of a surfactant, water and a surfactant.

The surfactant can be a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof.

The premixed liquid ethylene propylene diene terpolymer (EPDM) component is sometimes referenced herein as the "EPDM cement", "EPDM starting material", "premixed liquid ethylene propylene diene component", or "premixed liquid EPDM component."

The remixed liquid EPDM component in embodiments, contains 4 weight percent to 50 weight percent of solid ethylene/propylene polymer with a molecular weight from 1300000 Mw to 5000 Mw.

Molecular weights from 10000 Mw to 600000 Mw are also considered useful herein for the solid ethylene/propylene polymer. Molecular weights that are from 5000 Mw to 80000 Mw are also useful for the solid ethylene/propylene polymer.

The solid ethylene/propylene polymer in embodiments is made of random covalently linked monomers of ethylene and propylene having weight ratios from 40:60 to 85:15 of ethylene:propylene respectively.

The solid ethylene/propylene polymer is covalently bonded to a non-conjugated diene. In embodiments, the non-conjugated diene is from 0.25 weight percent to 15 weight percent of the solid polymer.

The diene in embodiments, can be a methylidene norbornene, a dicyclopentadiene, an ethylidene norbornene, and a 1,4-hexadiene vinyl norbornene.

The premixed liquid EPDM component can be in 50 weight percent to 96 weight percent of a solvent based on the total weight of the premixed liquid ethylene propylene diene terpolymer component.

The solvent can be hexane, xylene, naptha, isopar, mineral spirits, toluene, or another hydrocarbon solvent capable of dissolving ethylene propylene diene terpolymer.

The solvent can be a pure solvent, such as pure hexane, or a combination of solvents.

The premixed liquid EPDM component can be blended with 10 weight percent to 70 weight percent of water.

The water can be distilled water, deionized water, tap water, process water, or blends of these waters.

The premixed liquid EPDM component can be blended with 1 weight percent to 30 weight percent of a surfactant.

The surfactant can be cationic surfactant, anionic surfactant, non-ionic surfactant, or combinations thereof.

An example of a cationic surfactant is a tetra-octyl ammonium chloride. An example of an anionic surfactant is a sulfosuccinate such as sodium dioctyl sulfosuccinate, carboxylates, or combinations thereof.

An example of a non-ionic surfactant can be polyoxyethylene sorbates.

The mixing of these ingredients is performed at an atmospheric pressure from 0.5 to 1.25 atmospheres until a homogenous uniform intermediate latex is formed.

In embodiments, the mixing can be performed ranging from a few minute to 24 hours at atmospheric pressure to form an intermediate latex with minimum frothing.

A first amount of curative is added to the homogenous uniform intermediate latex.

In embodiments the first amount of curative can be from 0.3 weight percent to 1.76 weight percent based on the total weight percent of the solution.

In embodiments, the curative can be a peroxide, a persulfate, a hydroperoxide, a peroxy-carbonate, thiuram, thiazole, dithiocarbamate, and xanthate.

To the formed latex with first curative, a first heat can be applied.

The first heat can be at temperatures from 40 degrees Celsius to 100 degrees Celsius.

A pressure can be applied with the first heating, wherein the pressure can range from 0.5 atmospheres (atm) to 1.25 atmospheres (atm). The pressure can be applied for various durations, depending on batch size, anywhere from 10 minutes to 60 minutes.

The pressure and heat are used to remove 95 weight percent to 99 weight percent of the solvent and form a partially cross-linked the latex.

In embodiments, the partial crosslinking can be 50 percent, in other embodiments the partial cross link can be 80 percent.

In other embodiments, the heating achieves from 50 percent to 98 percent cross-linking in the partially cross-linked latex.

Prior to undertaking another step, the partially cross-linked latex can be tested for crosslink density using ASTM test D3616 effective 2014.

If the ASTM test reveals a crosslink density less than a preset limit, at least one of: additional first curative and a second curative can be added to the partially cross-linked latex to achieve a total weight percent from 0.3 weight percent to 1.76 weight percent.

In embodiments, the first and second curatives are at least one of: a sulfur donating curative, and a free radical generating curative.

A second heat can be applied to the partially cross-linked latex to remove a quantity of water, such as 1 percent to 95 percent of the water.

The second heat can be at a temperature ranging from 50 degrees Celsius to 100 degrees Celsius.

The second heat can be applied in embodiments for a time period ranging from 10 minutes to 60 minutes or a longer time sufficient to form a cross-linked ethylene propylene diene terpolymer latex with a customer specified solids content from 30 weight percent to 60 weight percent solids based on the total weight of the latex, and wherein the polymers are cross-linked from 30 percent to 100 percent.

The method of manufacturing the latex provides a low energy demand to create the latex formulation because the amount of energy and heat to dry the rubber and redissolve is very low compared to other commercial processes.

The method can save 70 percent of the energy typically used in forming EPDM coatings and help conserve the planet, providing a highly cross-linked EPDM product with a significantly lower carbon footprint.

The method is energy efficient, and does not use high heat in the blending or curing providing an energy efficient and cost efficient way to produce the EPDM latex.

These EPDM lattices, when used as additives in paints and outdoor coatings, such as roofing materials, can provide a long lived coating, lasting up to 10 years, while being additionally environmentally friendly by not releasing volatile organic compounds into the atmosphere during application.

This method to manufacture the EPDM latex is economical, safe and usable in applications such as roofing materials, concrete sealants, bridge paint, or similar items.

A paint can be made using the EPDM latex of this method.

An adhesive can be made using the EPDM latex of this method.

The final high solids cross-linked ethylene propylene diene terpolymer latex can be a volatile organic compound free formulation.

The high solids cross-linked ethylene propylene diene terpolymer latex produces low emissions on curing, such as less than 50 g/L, which improves the health of workers applying the coating to a substrate, such as a house, or a boat.

The final high solids cross-linked ethylene propylene diene terpolymer latex is easy to handle and apply to a substrate, and has an easy flowability at temperatures ranging from 1 degree Celsius to 50 degrees Celsius.

The formulation is a low volatile organic compound formulation, such as less than 250 g/L, which is suitable for use in volatile organic compound regulated markets with a latex water based system. It will provide excellent adhesion to a variety of substrates, including EPDM membranes, EPDM coatings, metals, wood, and concrete.

The formulation is suitable for a wide variety of applications and provides resistance to moisture once dried.

The flowable final formulation, once applied and then dried, is expected to provide resistance to shrinkage and cracking for substrates to which it is applied.

It is expected that the final latex can be stored in unopened packaging at temperatures from 1 degree Celsius to 50 degrees Celsius and have a shelf life of about 12 months when stored as recommended.

In embodiments of the formulation a biocide can be adding to the latex after adding the curative to increase, the shelf life to up to 24 months.

In embodiments, the latex can be white, clear, opaque, or colored with a pigment, such as carbon black.

When used as a sealant coating, the latex formulation can seal the exposed edges of roof systems, including splices, T-joints, stepdowns, tie-ins, termination bars, and general flashing details.

The term "latex" refers to polymers dispersed in water with or without additional solvent.

The term "EPDM" refers to ethylene propylene diene terpolymers. These EPDM terpolymers have no double bonds in the backbone of the polymer chains and, thus, are less sensitive to oxygen and ozone and have high UV-resistance. In EPDM, the ethylene and propylene comonomers form a saturated polymer backbone with randomly distributed, non-conjugated diene monomers, which provide unsaturations attached to the main chain.

The term "high solids" refers to the total resulting formulation having at least 30 weight percent solids and up to 80 weight percent, as measured by ASTM D 1417-10 for synthetic rubber lattices.

The phrase "percent cross-linked" refers to the density of the cross-links formed in the resulting formulation. A percent cross-linked can be calculated by using the percent solubility of the polymer of the latex in toluene indicating the relative cross-linking of the polymer.

The term "water" refers to deionized water, tap water, distilled water, process water or combinations thereof.

The term "surfactant" refers to a detergent or a dispersant. In embodiments, the surfactant can double as a wetting agent.

The term "cured latex" refers to the cross-linked final EPDM formulation.

The term "minimal frothing" refers to an event upon mixing which adds air bubbles to less than 10 percent of the entire latex by volume. The unique formation of this invention is believed to have reduced bubble content, or minimal frothing when mixing at a high shear rate due the surface tension properties of the latex which is created by the combination of physical network junctions including temporary and trapped entanglements of chains formed with the aid of the surfactant.

The term "high shear" relates to the use of a high shear mixer. High shear is mixing at greater than 1000 revolutions per minute.

The method forms a cross-linked EPDM with a dynamic tensile modulus greater than non-cross-linked polymers of ethylene propylene monomers. The higher the cross-linking the more improved the dynamic tensile modulus.

This method provides a final formulation which has an improved tensile modulus, 50 percent to 500 percent increased tensile modulus, as compared to a non-cross-linked EPDM.

The final formulation, once dried, will have better solvent resistance than a less cross-linked or non-cross-linked EPDM, by at least 2 percent.

The final latex product can dry in the presence of air, forming a solid surface in less than 72 hours.

When the formulation dries, the cured material can have a long life, and significant toughness due to the high cross-linking of the polymer.

Cross-linking is initiated by the thermal decomposition of the peroxide. Next, the active radicals thus formed abstract hydrogen from the polymer chains to form macro-radicals. Finally, cross-linking results either from the combination of two macro-radicals or from the addition of a macro-radical to an unsaturated moiety of another primary elastomer chain.

It is theorized that this particular latex of EPDM can form temporary and trapped entanglements and provide dangling chains, and chain loops that create differences in the distribution of the cross-links creating the advantageous physical properties, of long life, and high density of molecules in a matrix, which provides the improved toughness over other formulations.

The chemical conversion rates, the amount of cross-linking, and chemistry of the bonds, optical spectroscopy, high-resolution NMR, titration of non-reacted functional groups can be used to show the benefits of the invention. The spectroscopic methods are particularly useful for quantitative analysis of cross-links.

Embodiments of the method can include adding 0.01 weight percent to 0.5 weight percent of a defoaming agent to the EPDM component prior to mixing to form the intermediate latex or adding the defoaming agent after the mixing with water and surfactant to form the intermediate latex.

In embodiments of the method, a defoaming agent can be a poly-dimethyl siloxane, a poly-dimethyl siloxane with finely divided silica, such as a DOW CORNING® 1500, or a petroleum distillate based agent, such as SUPRESSOR™ 2218 from Dow Corning. DOW CORNING® Antifoam 1430 and BYK 021 defoamer available from BYK-Chemie GmbH can also be used herein.

Even though the method can be produced with low shear mixing, in embodiments of the method the mixing of the EPDM component, water and surfactant can be a high shear mixing and can be performed using a high shear mixer.

Embodiments of the method can include adding to the partially cross-linked latex after adding the curative 1 weight percent to 10 weight percent of an anti-settling stabilizer before removing the water.

In embodiments, the anti-settling stabilizer can be another surfactant, such as a second detergent which can be non-ionic surfactant, such as glycerin.

Embodiments of the method can include blending the partially cross-linked latex with 0.1 weight percent to 0.2 weight percent of a biocide.

In embodiments, the weight percent of the biocide is based on the total weight of the formulation.

A usable biocide is benzisothiazolinone, such as BIOBIT® 20 available from The Dow Chemical Company. The biocide can be antimicrobial, providing antibacterial and antifungal protection. Another usable biocide can be a PROTECTOL® available from BASF.

Embodiments of the method can include adding to the partially cross-linked latex after adding the curative, 5 weight percent to 30 weight percent of a filler.

The filler can be a silica, a talc, a starch, carbon black, or combinations thereof.

Embodiments of the method can include blending into the partially cross-linked latex after adding the curative, 0.1 weight percent to 20 weight percent of a pigment.

In embodiments, the pigment can be a dye, a carbon black, a metal oxide, and combinations thereof.

In embodiments of the method, the first heating and the second heating can be performed using a heat exchanger, a heat transfer fluid, electrical heat, steam, or combinations thereof.

In embodiments of the method, the mixing can be within a closed vessel to prevent venting of volatile organic vapors.

In embodiments, the closed vessel can be a stainless steel closed vessel with inlet and outlet that can withstand pressures from 1 psig to 200 psig.

In embodiments, the heating can be performed using a laser or radiation to initiate generation of free radicals which in turn initiate crosslinking of the ethylene propylene diene terpolymer component in the intermediate latex.

In embodiments, the method involves applying a vacuum to the latex with curative during at least one of: the first heating and a second heating. A usable vacuum is from 0.001 to 0.1 megaPascals (MPa).

In other embodiments, the method uses a preset limit for the crosslink density that is at least 30 percent of the terpolymer.

Example 1

A hexane solution containing 8 weight percent solid ROYALENE® 525 polymer, was the premixed liquid EPDM component. ROYALENE® 525 has a 60:40 ethylene:propylene ratio and 8.09 weight percent ethylidene norbornene (ENB).

In this embodiment, 30 grams of the premixed liquid EPDM component was mixed with 60 grams of deionized water and 10.7 grams of a surfactant known as OT-75% which is a sulfosuccinate with 75 percent solids available from Cytec Industries.

The mixing occurred at 20,000 rpm for 1 minute using a Wiggen Hauser D-500 Shear Power Homogenizer at atmospheric pressure.

The uniform mixture was then charged with two drops of DOW CORNING® Antifoam 1500 using a plastic disposable dropper into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.5 grams of peroxide curative VULCUP® available from Arkoma, Inc. was added to form a partially cross-linked latex in the same azeotropic distillation apparatus. The mixture was refluxed under partial vacuum at 60 degrees Celsius until 50 weight percent solids latex was obtained with a 70 percent relative cross-linking.

Expected Physical Properties and Characteristics for the final latex of Example 1:

|  | Typical Values | Test Method |
| --- | --- | --- |
| FINAL FORMULATION |  |  |
| Color | White | Visual |
| Specific Gravity | 1.02 | ASTM D 1475 |
| Brookfield Viscosity | 32 cps | ASTM D 2196 |
| VOC Content | <50 g/L | ASTM D 2369 |
| Solids Content | 50% | ASTM C 681 |
| Flash Point (open cup) | In excess of 90 degrees Centigrade | ASTM D 56 |
| Application Properties |  |  |
| Service Temperature | −50° C. to 100° C. | ASTM D 3359 |
| Application Temp | 1° C. to 50° C. | ASTM C 603 |

Turning now to the Figures, FIG. 1 contains additional information relative to Examples 2-4, Example 2

A hexane solution containing 8 weight percent solid ROYALENE® 360 polymer was the premixed liquid EPDM component. ROYALENE® 360 has a 52:48 ethylene:propylene ratio and 2 weight percent dicyclopentadiene (DCPD).

187.5 grams of the premixed liquid EPDM component was mixed with 54.5 grams of deionized water and 30.2 grams of a fatty acid modified polyester surfactant, which is EFKA® 6225 from BASF in this example.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.3 grams of peroxide curative 5-bis (tert-butylperoxy)-2,5-dimethylhexane (TRIGONOX® 101 from AkzoNobel) was added to form a partially cross-linked latex in the same azeotropic distillation apparatus. The mixture was refluxed under partial vacuum at 60 degrees Celsius until 46 weight percent solids latex was obtained with a 45 percent relative crosslinking.

Example 3

A hexane solution containing 8 weight percent solid ROYALENE® 360 polymer was the premixed liquid EPDM component. ROYALENE® 360 has a 52:48 ethylene:propylene ratio and 2 weight percent dicyclopentadiene (DCPD).

In embodiments, 625 grams of the premixed liquid EPDM component was mixed with 29 grams of deionized water and 20 grams of a fatty acid modified polyester surfactant, which was EFKA® 6225 from BASF.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.0 grams of peroxide curative 5-bis (tert-butylperoxy)-2,5-dimethylhexane (TRIGONOX® 101 from Akzo Nobel) was added to form a partially cross-linked latex in the same azeotropic distillation apparatus. The mixture was refluxed under partial vacuum at 60 degrees Celsius until 71 weight percent solids latex was obtained with an 85 percent relative crosslinking.

Example 4

A hexane solution containing 8 weight percent solid ROYALENE® 360 polymer was the premixed liquid EPDM component. ROYALENE® 360 has a 52:48 ethylene:propylene ratio and 2 weight percent dicyclopentadiene (DCPD).

In this embodiment, 875 grams of the premixed liquid EPDM component was mixed with 18.5 grains of deionized water and 10 grams of a fatty acid modified polyester surfactant, which was EFKA® 6225 from BASE.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.5 grams of peroxide curative 5-bis (tert-butylperoxy)-2,5-dimethylhexane (TRIGONOX® 101 from AkzoNobel) was added to form a partially cross-linked latex in the same azeotropic distillation apparatus. The mixture was refluxed under partial vacuum at 60 degrees Celsius until 82 weight percent solids latex was obtained with a 100 percent relative crosslinking.

FIG. 2 contains additional information relative to Examples 5-7.

Example 5

A hexane solution containing 4 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 2200 grams of the premixed liquid EPDM component was mixed with 10.1 grams of deionized water and 1.0 grams of fatty amine ethoxylated salt surfactant, such as NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.6 grams of sulfur curative, which was RM Sulfur available from AkroChem Corporation, and 0.3 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 60 degrees Celsius until 90 weight percent solids latex was obtained with a 50 percent relative crosslinking.

Example 6

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 875 grams of the premixed liquid EPDM component was mixed with 27.7 grams of deionized water and 1.0 grams of fatty amine ethoxylated salt surfactant, which was NUOSPERSE® FA 607 from Elementis Specicalties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.9 grams of sulfur curative, which was RM Sulfur available from AkroChem Corporation, and 0.4 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 72 weight percent solids latex was obtained with an 85 percent relative crosslinking.

Example 7

A hexane solution containing 50 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 100 grams of the premixed liquid EPDM component was mixed with 47.2 grams of deionized water and 1.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 53 weight percent solids latex was obtained with a 98 percent relative crosslinking.

FIG. 3 contains additional information relative to Examples 8-10.

Example 8

A hexane solution containing 8 weight percent solid ROYALENE® 535 polymer was the premixed liquid EPDM component. ROYALENE® 511 has a 60:40 ethylene:propylene ratio and 9.4 weight percent Ethylidene Norbornene (ENB).

In this embodiment, 325 grams of the premixed liquid EPDM component was mixed with 70.1 grams of deionized water and 3.0 grams of lithium 3-[(1H,1H,2H,2H-Fluoroalkyl)Thio] surfactant, which was ZONYL® FSA available from E. I. Du Pont.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.6 grams of sulfur curative, which was RM Sulfur from AkroChem Corporation and 0.3 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 30 weight percent solids latex was obtained with a 60 percent relative crosslinking.

Example 9

A hexane solution containing 8 weight percent solid ROYALENE® 535 polymer was the premixed liquid EPDM component. ROYALENE® 511 has a 60:40 ethylene:propylene ratio and 9.4 weight percent Ethylidene Norbornene (ENB).

In this embodiment, 625 grams of the premixed liquid EPDM component was mixed with 42.7 grams of deionized water and 6.0 grams of lithium 3-[(1H,1H,2H,2H-Fluoroalkyl)Thio] surfactant, which was ZONYL® FSA available from E. I. Du Pont.

The mixing occurred at 20,000 rpm for 1 minute using a Wiggen Hauser D-500 Shear Power Homogenizer at atmospheric pressure.

This high shear mixing was followed by repeated passes on a CEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.9 grams of sulfur curative, which was RM Sulfur available from AkroChem Corporation, and 0.4 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 57 weight percent solids latex was obtained with a 65 percent relative crosslinking.

Example 10

A hexane solution containing 8 weight percent solid ROYALENE® 535 polymer was the premixed liquid EPDM component. ROYALENE® 511 has a 60:40 ethylene:propylene ratio and 9.4 weight percent Ethylidene Norbornene (ENB).

In this embodiment, 875 grams of the premixed liquid EPDM component was mixed with 18.2 grams of deionized water and 10 grams of lithium 3-[(1H,1H,2H,2H-Fluoroalkyl)Thio] surfactant, which was ZONYL® FSA from E. I. Du Pont.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 82 weight percent solids latex was obtained with a 65 percent relative crosslinking.

FIG. 4 contains additional information relative to Examples 11-18.

Example 11

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 46.16 grams of deionized water and 1.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a CEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 52 weight percent solids latex was obtained with an 80 percent relative crosslinking.

Following the curing process, 1.0 grams of hydroxyethyl cellulose anti-settling stabilizer, which was CELLOSIZE™ ER 30M from The Dow Chemical Company, was added to the same azeotropic distillation apparatus and refluxed at 25 degrees Celsius until a uniform latex mixture was formed. This latex has a solid content of 54 percent.

Example 12

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 45.06 grams of deionized water and 1.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a CEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur available from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 51 weight percent solids latex was obtained with an 80 percent relative crosslinking.

Following the curing process, 2.0 grams of hydroxyethyl cellulose anti-settling stabilizer, which was CELLOSIZE™ ER 30M from The Dow Chemical Company, and 0.1 gram of 3,5-Dimethyl-2H-1,3,5-thiadiazinane-2-thione biocide, which was PROTECTOL® DZ from BASE, were added to the same azeotropic distillation apparatus and refluxed at 25 degrees Celsius until a uniform latex mixture was formed. This latex has a solid content of 55 percent.

Example 13

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 36.15 grams of deionized water and 2.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation, were added to form a partially cross-linked latex in the same azeotropic distillation apparatus. The mixture was refluxed under partial vacuum at 74 degrees Celsius until 56 weight percent solids latex was obtained with an 80 percent relative crosslinking.

Following the curing process, 5.0 grams of hydroxyethyl cellulose anti-settling stabilizer, which was CELLOSIZE® ER 30M from The Dow Chemical Company, 5.0 grams of Talc filler, which is obtainable from CIMBAR Performance Minerals, and 0.01 gram of defoamer BYK® 021, which is obtainable from BYK-Chemie GmbH, were added to the same azeotropic distillation apparatus and refluxed at 25 degrees Celsius until a uniform latex mixture was formed. This latex has a solid content of 64 percent.

Example 14

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 10.96 grams of deionized water and 2.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a CEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 56 weight percent solids latex was obtained with an 80 percent relative crosslinking.

Following the curing process, 5.0 grams of hydroxyethyl cellulose anti-settling stabilizer, which was CELLOSIZE™ ER 30M from The Dow Chemical Company, 30 grams of silica filler, which was HI-SIL® 135 from PPG Industries, and 0.2 gram of defoamer BYK® 021, which is obtainable from BYK-Chemie GmbH, were added to the same azeotropic distillation apparatus and refluxed at 25 degrees Celsius until a uniform latex mixture was formed. This latex has a solid content of 89 percent.

Example 15

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 500 grams of the premixed liquid EPDM component was mixed with 35.66 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) from AkroChem Corporation were added to form a partially cross-linked latex in the same azeotropic distillation apparatus. The mixture was refluxed under partial vacuum at 74 degrees Celsius until 56 weight percent solids latex was obtained with an 85 percent relative crosslinking.

Following the curing process, 8.0 grams of hydroxyethyl cellulose anti-settling stabilizer, which was CELLOSIZE™ ER 30M from The Dow Chemical Company, 5.0 grams of Talc filler, which is obtainable from CIMBAR Performance Minerals, 0.5 gram of defoamer BYK® 021, which is obtainable from BYK-Chemie GmbH, and 5.0 grams of Titanium Dioxide pigment, which was TIOXIDE® TR23 from Huntsman International, LLC, were added to the same azeotropic distillation apparatus and refluxed at 25 degrees Celsius until a uniform latex mixture was formed. This latex has a solid content of 64 percent.

Example 16

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 500 grams of the premixed liquid EPDM component was mixed with 35.66 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 54 weight percent solids latex was obtained with an 85 percent relative crosslinking.

Following the curing process, 8.0 grams of hydroxyethyl cellulose anti-settling stabilizer, which was CELLOSIZE® 30M from The Dow Chemical Company, 5.0 grams of Talc filler, which is obtainable from CIMBAR Performance Minerals, 0.5 gram of defoamer BYK® 021, which is obtainable from BYK-Chemie GmbH, and 5.0 grams of black pigment, which was REGAL® 300 from Cabot Corporation, were added to the same azeotropic distillation apparatus and refluxed at 25 degrees Celsius until a uniform latex mixture was formed. This latex has a solid content of 64 percent.

Example 17

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 500 grams of the premixed liquid EPDM component was mixed with 34.5 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 44 weight percent solids latex was obtained with an 85 percent relative crosslinking.

Following the curing process, 8.0 grams of hydroxyethyl cellulose anti-settling stabilizer, which was CELLOSIZE™ ER 30M from The Dow Chemical Company, 5.0 grams of Talc filler, which is obtainable from CIMBAR Performance Minerals, 0.5 gram of defoamer BYK® 021, which is obtainable from BYK-Chemie GmbH, and 0.1 grams of red pigment, which was Synthesized Red oxide from Unilex Colours & Chemicals Limited, were added to the same azeotropic distillation apparatus and refluxed at 25 degrees Celsius until a uniform latex mixture was formed. This latex has a solid content of 59 percent.

Example 18

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 500 grams of the premixed liquid EPDM component was mixed with 13.46 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) from AkroChem Corporation were added to form a partially cross-linked latex in the same azeotropic distillation apparatus. The mixture was refluxed under partial vacuum at 74 degrees Celsius until 56 weight percent solids latex was obtained with an 85 percent relative crosslinking.

Following the curing process, 8.0 grams of hydroxyethyl cellulose anti-settling stabilizer, which was CllLOSIZE™ ER 30M from The Dow Chemical Company, 0.1 gram of 3,5-Dimethyl-2H-1,3,5-thiadiazinane-2-thione biocide, which was PROTECOL® DZ from BASF, 0.5 gram of defoamer BYK® 021, which is obtainable from BYK-Chemie GmbH, 20 grams of silica filler, which was HI-SIL® 135 from PPG Industries, and 10.0 grams of red pigment, which was Synthesized Red oxide from Unilex Colours & Chemicals Limited, were added to the same azeotropic distillation apparatus and refluxed at 25 degrees Celsius until a uniform latex mixture was formed. This latex has a solid content of 87 percent.

While these embodiments have been described with emphasis on the embodiments, it should be understood that within the scope of the appended claims, the embodiments might be practiced other than as specifically described herein.

What is claimed is:

1. A method for making a cross-linked ethylene propylene diene terpolymer latex with a customer specified solids content from 30 weight percent to 60 weight percent based on the total weight of the latex, the method comprising:
  a. blending 15 weight percent to 88 weight percent of a premixed liquid ethylene propylene diene terpolymer component, with 10 weight percent to 70 weight percent of a water and 1 weight percent to 30 weight percent of a surfactant, wherein the premixed liquid ethylene propylene diene terpolymer component comprises:
    (i) 4 weight percent to 50 weight percent of a solid polymer with a molecular weight from 1300000 Mw to 5000 Mw consisting of: a random covalently linked monomers of ethylene and propylene having weight ratios from 40:60 to 85:15 of ethylene:propylene respectively; and wherein 0.25 weight percent to 15 weight percent of the solid polymer is a non-conjugated diene; and
    (ii) 50 weight percent to 96 weight percent of a solvent;
  b. performing a mixing using the premixed liquid ethylene propylene diene terpolymer component, water and surfactant at an atmospheric pressure from 0.5 to 1.25 atmospheres until an homogenous uniform intermediate latex is formed;
c. adding a first curative to the intermediate latex, forming a latex with curative;
d. applying a first heating to the latex with curative at a temperature ranging from 40 degrees Celsius to 100 degrees Celsius, at a pressure from 0.5 to 1.25 atmospheres to remove 95 weight percent to 99 weight percent of the solvent, thereby forming a partially cross-linked latex;
e. testing the partially cross-linked latex for crosslink density using ASTM test D3616 effective 2014 and if the ASTM test reveals a crosslink density less than a preset limit, adding at least one of: additional first curative and a second curative to achieve a total weight percent from 0.3 weight percent and 1.76 weight percent and further, wherein the first and second curatives are at least one of: a sulfur donating curative, and a free radical generating curative; and
f. applying a second heating to the partially cross-linked latex to remove a quantity of water using a temperature ranging from 50 degrees Celsius to 100 degrees Celsius for 10 minutes to 60 minutes sufficient to form a cross-linked ethylene propylene diene terpolymer latex with a customer specified solids content from 30 weight percent to 60 weight percent solids based on the total weight of the latex and wherein the ethylene propylene diene polymer is cross-linked from 30 percent to 100 percent.

2. The method of claim 1, further comprising adding 0.01 to 0.5 weight percent of a defoaming agent prior to mixing to form the intermediate latex or adding the defoaming agent after the mixing to form the intermediate latex.

3. The method of claim 2, wherein the defoaming agent is selected from the group: a poly-dimethyl siloxane, a poly-dimethyl siloxane with finely divided silica, petroleum distillate based agents or combinations thereof.

4. The method of claim 1, wherein in the first heating achieves from 50 percent to 98 percent cross-linking in the partially cross-linked latex.

5. The method of claim 1, wherein the mixing is high shear mixing using a high shear mixer.

6. The method of claim 1, further comprising adding to the latex after adding the curative at least one of:
a. 1 weight percent to 10 weight percent of an anti-settling stabilizer before removing the water, wherein the anti-settling stabilizer is a surfactant;
b. 0.1 weight percent to 0.2 weight percent of a biocide;
c. 5 weight percent to 30 weight percent of a filler selected from the group: a silica, a talc, a starch, a carbon black, or combinations thereof; and
d. 0.1 weight percent to 20 weight percent of a pigment, wherein the pigment is selected from the group: a dye, carbon black, a metal oxide.

7. The method of claim 1, wherein the first heating and the second heating can be performed using a heat exchanger, a heat transfer fluid, electrical heat, steam, or combinations thereof.

8. The method of claim 1, wherein the mixing is within a closed vessel to prevent venting of volatile organic vapors.

9. The method of claim 1, wherein the water is selected from the group: distilled water, deionized water, tap water, process water, and combinations thereof.

10. The method of claim 1, wherein the surfactant is selected from the group: cationic surfactants, anionic surfactants, non-ionic surfactants or combinations thereof.

11. The method of claim 1, wherein the non-conjugated diene comprises at least one of methylidene norbornene, dicyclopentadiene, ethylidene norbornene, and 1,4-hexadiene, vinyl norbornene.

12. The method of claim 1, wherein the solvent is at least one of: hexane, xylenes, naphtha, isopar, mineral spirits, toluene, and another hydrocarbon solvent capable of dissolving ethylene propylene diene terpolymer.

13. The method of claim 1, wherein the curatives are at least one of: a peroxide, a persulfate, hydroperoxide, peroxycarbonate, thiuram, thiazole, dithiocarbamate, and xanthate.

14. The method of claim 1, further comprising heating by using a laser or radiation to initiate generation of free radicals which in turn initiate crosslinking of the ethylene propylene diene terpolymer component in the intermediate latex.

15. The method of claim 1, further comprising applying a vacuum to the latex with curative during at least one of: the first heating and second heating, wherein the vacuum is from 0.001 to 0.1 megaPascals (MPa).

16. The method of claim 1, wherein the preset limit for the crosslink density is 30 percent of the terpolymer.

17. The method of claim 1, wherein the surfactant is selected from the group consisting of: a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof.

18. A paint comprising the ethylene propylene diene terpolymer latex made by the method of claim 1.

19. An adhesive comprising the ethylene propylene diene terpolymer latex made by the method of claim 1.

* * * * *